US012785074B2

(12) United States Patent
Sakitani et al.

(10) Patent No.: US 12,785,074 B2
(45) Date of Patent: *Nov. 3, 2026

(54) NON-AQUEOUS ELECTROLYTE SECONDARY BATTERY

(71) Applicant: Panasonic Energy Co., Ltd., Moriguchi (JP)

(72) Inventors: Nobuhiro Sakitani, Osaka (JP); Tomoki Ikeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 678 days.

This patent is subject to a terminal disclaimer.

(21) Appl. No.: 18/038,616

(22) PCT Filed: Nov. 15, 2021

(86) PCT No.: PCT/JP2021/041889

§ 371 (c)(1),
(2) Date: May 24, 2023

(87) PCT Pub. No.: WO2022/113797

PCT Pub. Date: Jun. 2, 2022

(65) Prior Publication Data

US 2024/0021789 A1 Jan. 18, 2024

(30) Foreign Application Priority Data

Nov. 27, 2020 (JP) ................................ 2020-197432

(51) Int. Cl.
*H01M 50/107* (2021.01)
*H01M 4/36* (2006.01)
(Continued)

(52) U.S. Cl.
CPC ....... *H01M 4/364* (2013.01); *H01M 10/0587* (2013.01); *H01M 50/107* (2021.01); *H01M 2004/028* (2013.01); *H01M 10/0525* (2013.01)

(58) Field of Classification Search
CPC ............ H01M 4/364; H01M 10/0587; H01M 50/107; H01M 4/13; H01M 10/052; H01M 2004/028; Y02P 70/50
See application file for complete search history.

(56) References Cited

U.S. PATENT DOCUMENTS

2005/0221182 A1* 10/2005 Fujiwara ................ H01M 4/13 429/231.1
2010/0266882 A1* 10/2010 Igarashi ................ H01M 4/043 429/94
(Continued)

FOREIGN PATENT DOCUMENTS

CN 102187496 A 9/2011
JP 2005-515465 A 5/2005
(Continued)

OTHER PUBLICATIONS

JP2013037955 MT (Year: 2013).*
(Continued)

*Primary Examiner* — Alexander Usyatinsky
(74) *Attorney, Agent, or Firm* — WHDA, LLP

(57) ABSTRACT

A non-aqueous electrolyte secondary battery is characterized by comprising an electrode body in which a positive electrode and a negative electrode face each other with a separator therebetween, and a battery case that accommodates the electrode body, wherein: the positive electrode has a positive electrode mixture layer containing a positive electrode active material; and when the non-aqueous electrolyte secondary battery is used in a fixed state, and the electrode body in the fixed state is bisected in the vertical direction, a dibutyl phthalate oil absorption amount of the positive electrode active material contained in the positive electrode mixture layer disposed in the top half region is higher than a dibutyl phthalate oil absorption amount of the
(Continued)

positive electrode active material contained in the positive electrode mixture layer disposed in the bottom half region.

6 Claims, 3 Drawing Sheets

(51) Int. Cl.

| | |
|---|---|
| ***H01M 10/0587*** | (2010.01) |
| *H01M 4/02* | (2006.01) |
| *H01M 10/0525* | (2010.01) |

(56) References Cited

U.S. PATENT DOCUMENTS

| | | | | |
|---|---|---|---|---|
| 2011/0223456 | A1 | 9/2011 | Sugaya et al. | |
| 2012/0196185 | A1* | 8/2012 | Kono .................. | H01M 4/5825 429/231.95 |
| 2014/0255783 | A1 | 9/2014 | Takahata et al. | |
| 2015/0194664 | A1 | 7/2015 | Saka et al. | |
| 2016/0181668 | A1 | 6/2016 | Morita | |
| 2018/0076450 | A1 | 3/2018 | Torita et al. | |

FOREIGN PATENT DOCUMENTS

| | | | |
|---|---|---|---|
| JP | 2005-285606 | A | 10/2005 |
| JP | 2007-095534 | A | 4/2007 |
| JP | 2008-174444 | A | 7/2008 |
| JP | 2013-37955 | A | 2/2013 |
| JP | 2013-051028 | A | 3/2013 |
| JP | 2013-131322 | A | 7/2013 |
| JP | 2014-35919 | A | 2/2014 |
| JP | 2015-130298 | A | 7/2015 |
| JP | 2016-100241 | A | 5/2016 |
| JP | 2016-219148 | A | 12/2016 |
| JP | 2016-225223 | A | 12/2016 |
| JP | 2017-016804 | A | 1/2017 |
| JP | 2018-045815 | A | 3/2018 |
| WO | 03062774 | A1 | 7/2003 |
| WO | 2011/052126 | A1 | 5/2011 |
| WO | 2014/195995 | A1 | 12/2014 |

OTHER PUBLICATIONS

The decision of JPO to grant a Patent for Application JP 2022565235 (Year: 2026).*

International Search Report dated Dec. 21, 2021, issued in counterpart International Application No. PCT/JP2021/041889, with English Translation. (5 pages).

Written Opinion of the International Searching Authority (Form PCT/ISA/237) dated Dec. 21, 2021, issued in counterpart International Application No. PCT/JP2021/041889. (4 pages).

Non-Final Office Action dated Dec. 23, 2025, issued in U.S. Appl. No. 18/038,135 (17 pages).

Office Action dated Jul. 29, 2025, issued in counterpart CN Application No. 202180078764.0, with English translation. (10 pages).

International Search Report dated Dec. 21, 2021, issued in counterpart Application No. PCT/JP2021/042170, with English translation (5 pages); cited in US Office Action dated Dec. 23, 2025.

Written Opinion dated Dec. 21, 2021, issued in counterpart Application No. PCT/JP2021/042170 (3 pages); cited in US Office Action dated Dec. 23, 2025.

Non-Final Office Action dated Dec. 2, 2025, issued in U.S. Appl. No. 18/038,161 (16 pages).

International Search Report dated Dec. 21, 2021, issued in counterpart Application No. PCT/JP2021/041885, with English translation (5 pages); cited in US Office Action dated Dec. 2, 2025.

Written Opinion dated Dec. 21, 2021, issued in counterpart Application No. PCT/JP2021/041885 (3 pages); cited in US Office Action dated Dec. 2, 2025.

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/041889 filed on Nov. 15, 2021, which claims the benefit of priorities under 35 U.S.C. § 119(a) of Japanese Patent Application No. 2020-197432 filed in Japan on Nov. 27, 2020, the contents of which are incorporated herein by reference.

TECHNICAL FIELD

The present disclosure relates to a non-aqueous electrolyte secondary battery.

BACKGROUND

In recent years, as a secondary battery having a high output and a high energy density, a non-aqueous electrolyte secondary battery which includes a positive electrode, a negative electrode, and a non-aqueous electrolyte and performs charge and discharge by moving lithium ions and the like between the positive electrode and the negative electrode is widely used.

For example, Patent Literature 1 discloses a non-aqueous electrolytic secondary battery including: a wound electrode assembly including a positive electrode sheet and a negative electrode sheet; and a non-aqueous electrolytic solution, wherein the positive electrode sheet includes: an elongated positive electrode current collector; and a positive electrode mixture layer containing at least a positive electrode active material formed on a surface of the positive electrode current collector, both ends of the positive electrode mixture layer in a winding axis direction of the wound electrode assembly are mainly composed of a first positive electrode active material, a central portion including at least a center of the positive electrode mixture layer in the winding axis direction is mainly composed of a second positive electrode active material, a DBP absorption [mL/100 g] based on JIS K6217-4 is different between the first positive electrode active material and the second positive electrode active material, and a DBP absorption A [mL/100 g] of the first positive electrode active material is smaller than a DBP absorption B [mL/100 g] of the second positive electrode active material.

In addition, for example, Patent Literature 2 proposes a positive electrode active material including a powder of a lithium-containing composite oxide and having a dibutyl phthalate oil absorption of 20 mL/100 g to 40 mL/100 g.

CITATION LIST

Patent Literature

Patent Literature 1: JP 2013-131322 A
Patent Literature 2: JP 2005-285606 A

SUMMARY

Technical Problem

An object of the present disclosure is to provide a non-aqueous electrolyte secondary battery capable of improving charge-discharge cycle characteristics.

Solution to Problem

A non-aqueous electrolyte secondary battery according to one aspect of the present disclosure includes: an electrode assembly including a positive electrode, a negative electrode, and a separator, the positive electrode and the negative electrode facing each other with the separator interposed between the positive electrode and the negative electrode; and a battery case that houses the electrode assembly, wherein the positive electrode has a positive electrode mixture layer containing a positive electrode active material, and when the non-aqueous electrolyte secondary battery is used in a fixed state and the electrode assembly in the fixed state is divided into two equal parts in a vertical direction, a dibutyl phthalate oil absorption of the positive electrode active material contained in the positive electrode mixture layer disposed in an upper half region is higher than a dibutyl phthalate oil absorption of the positive electrode active material contained in the positive electrode mixture layer disposed in a lower half region.

A non-aqueous electrolyte secondary battery according to one aspect of the present disclosure includes: an electrode assembly including a positive electrode, a negative electrode, and a separator, the positive electrode and the negative electrode facing to each other with the separator interposed between the positive electrode and the negative electrode; an exterior can that has a bottomed cylindrical shape and houses the electrode assembly; and a sealing assembly that closes an opening of the exterior can, wherein the positive electrode has a positive electrode mixture layer containing a positive electrode active material, and when the electrode assembly is divided into two equal parts in an insertion direction into the exterior can, a dibutyl phthalate oil absorption of the positive electrode active material contained in the positive electrode mixture layer disposed in a half region on a side of the sealing assembly is higher than a dibutyl phthalate oil absorption of the positive electrode active material contained in the positive electrode mixture layer disposed in a half region on a bottom side of the exterior can.

A non-aqueous electrolyte secondary battery according to one aspect of the present disclosure includes: an electrode assembly including a positive electrode, a negative electrode, and a separator, the positive electrode and the negative electrode facing to each other with the separator interposed between the positive electrode and the negative electrode; an exterior can that has a bottomed cylindrical shape and houses the electrode assembly; and a sealing assembly that closes an opening of the exterior can, wherein the positive electrode has a positive electrode mixture layer containing a positive electrode active material, and when the electrode assembly is divided into two equal parts in an insertion direction into the exterior can, a dibutyl phthalate oil absorption of the positive electrode active material contained in the positive electrode mixture layer disposed in a half region on a bottom side of the exterior can is higher than a dibutyl phthalate oil absorption of the positive electrode active material contained in the positive electrode mixture layer disposed in a half region on a side of the sealing assembly.

ADVANTAGEOUS EFFECTS OF INVENTION

According to one aspect of the present disclosure, charge-discharge cycle characteristics can be improved.

DESCRIPTION OF EMBODIMENTS

An example of the embodiment will be described with reference to the drawings. The non-aqueous electrolyte secondary battery of the present disclosure is not limited to the embodiment described below. The drawings referred to in the description of the embodiment are schematically illustrated.

Figure 1:
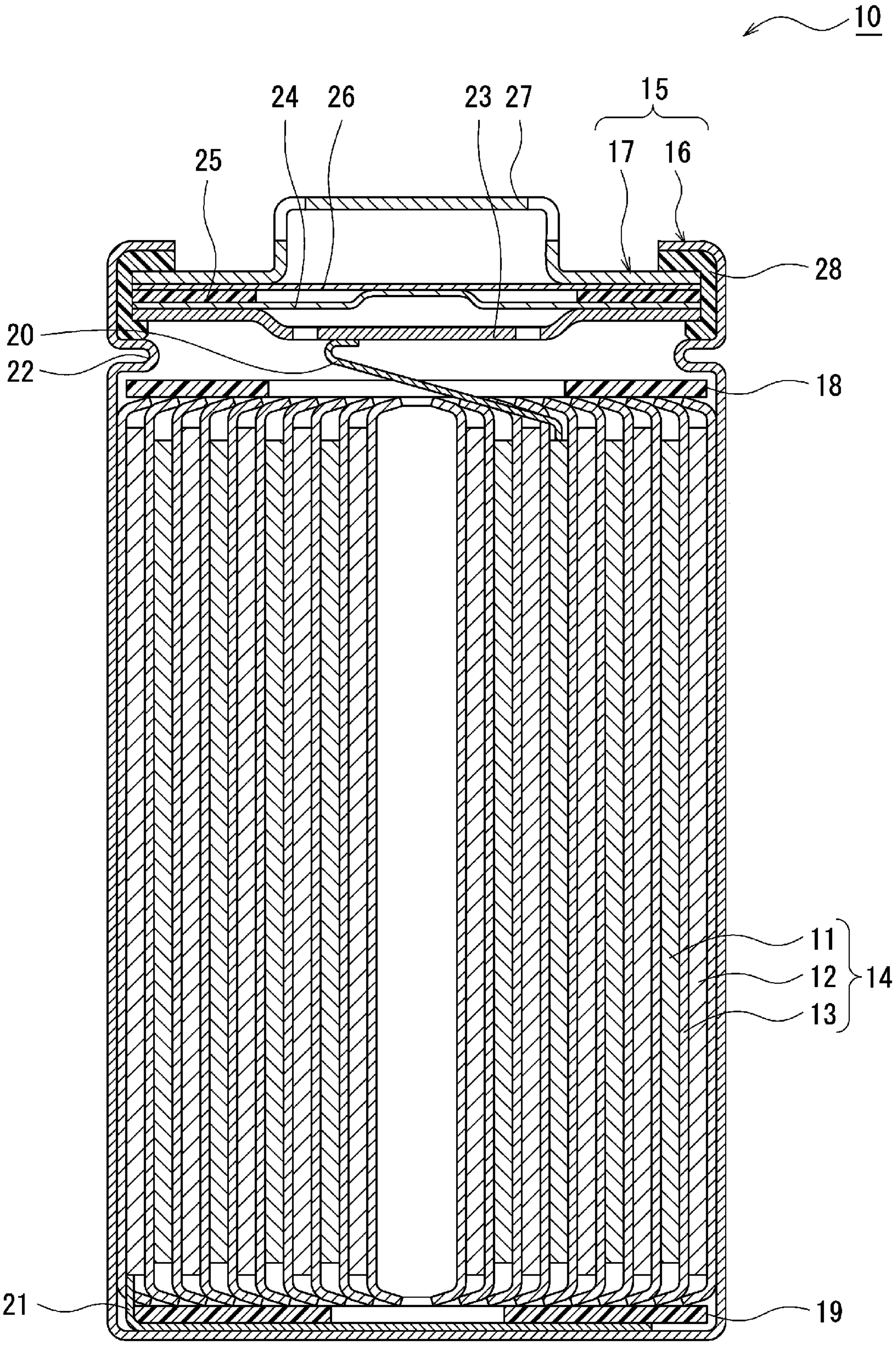
FIG. 1 is a cross-sectional view of a non-aqueous electrolyte secondary battery as an example of an embodiment.

FIG. 1 is a cross-sectional view of a non-aqueous electrolyte secondary battery as an example of the embodiment. A non-aqueous electrolyte secondary battery 10 illustrated in FIG. 1 includes a wound electrode assembly 14 formed by winding a positive electrode 11 and a negative electrode 12 with a separator 13 interposed therebetween, a non-aqueous electrolyte, insulating plates 18 and 19 respectively disposed above and below the electrode assembly 14, and a battery case 15 that houses the above-described members. The battery case 15 includes an exterior can 16 and a sealing assembly 17 that closes an opening of the exterior can 16. Instead of the wound electrode assembly 14, another form of electrode assembly such as a stacked electrode assembly formed by alternately stacking positive electrodes and negative electrodes with a separator interposed therebetween may be applied. Examples of the battery case 15 include a bottomed cylindrical exterior can having a cylindrical shape, a rectangular shape, a coin shape, a button shape, or the like, and a pouch exterior package formed by laminating a resin sheet and a metal sheet.

The exterior can 16 is, for example, a bottomed cylindrical metal case. A gasket 28 is provided between the exterior can 16 and the sealing assembly 17 to ensure sealability of the inside of the battery. The exterior can 16 has, for example, a projecting portion 22 supporting the sealing assembly 17, and a part of a side face of the exterior can 16 projects inward to form the projecting portion 22. The projecting portion 22 is preferably formed in an annular shape along the circumferential direction of the exterior can 16, and supports the sealing assembly 17 on the upper face thereof.

The sealing assembly 17 has a structure in which a filter 23, a lower vent member 24, an insulating member 25, an upper vent member 26, and a cap 27 are stacked in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected to each other at the central portions of respective members, and the insulating member 25 is interposed between the peripheral parts of respective members. When the internal pressure of the non-aqueous electrolyte secondary battery 10 increases due to heat generated by an internal short circuit or the like, the lower vent member 24 deforms so as to push up the upper vent member 26 toward the cap 27 and breaks, and the current path between the lower vent member 24 and the upper vent member 26 is cut off, for example. When the internal pressure further increases, the upper vent member 26 breaks, and the gas is discharged from an opening of the cap 27.

In the non-aqueous electrolyte secondary battery 10 illustrated in FIG. 1, a positive electrode lead 20 attached to the positive electrode 11 extends to the sealing assembly 17 side through the through hole of the insulating plate 18, and a negative electrode lead 21 attached to the negative electrode 12 extends to the bottom side of the exterior can 16 through the outside of the insulating plate 19. The positive electrode lead 20 is connected to a lower face of the filter 23 which is a bottom plate of the sealing assembly 17 by welding or the like, and the cap 27 which is a top plate of the sealing assembly 17 electrically connected to the filter 23 serves as a positive electrode terminal. The negative electrode lead 21 is connected to the inner face of the bottom of the exterior can 16 by welding or the like, and the exterior can 16 serves as a negative electrode terminal.

In the present embodiment, the sealing assembly 17 is the upper face of the battery case 15, the face of the exterior can 16 facing the sealing assembly 17 is the bottom face of the battery case 15, and the side face connecting the upper face and the bottom face is the side face of the battery case 15. The direction from the bottom face to the upper face of the battery case 15 is defined as the height direction of the non-aqueous electrolyte secondary battery 10.

Hereinafter, each component of the non-aqueous electrolyte secondary battery 10 will be described in detail.

[Positive Electrode]

The positive electrode 11 includes a positive electrode current collector and a positive electrode mixture layer provided on the positive electrode current collector. A foil of a metal which is stable in the potential range of the positive electrode 11, such as aluminum, a film in which the metal is disposed on a surface layer thereof, or the like can be used for the positive electrode current collector. The positive electrode mixture layer contains a positive electrode active material, and preferably further contains a binder, a conductive agent, and the like.

The positive electrode 11 is produced, for example, by applying a positive electrode mixture slurry containing a positive electrode active material, a binder, a conductive agent, and the like onto a positive electrode current collector, drying the slurry to form a positive electrode mixture layer, and then rolling the positive electrode mixture layer with a rolling roller or the like. The method for producing the positive electrode mixture layer will be described later in detail.

In the present embodiment, the positive electrode active material contained in the positive electrode mixture layer includes a plurality of positive electrode active materials having different dibutyl phthalate oil absorptions. Hereinafter, a specific description will be given with reference to the drawings.

Figure 2:
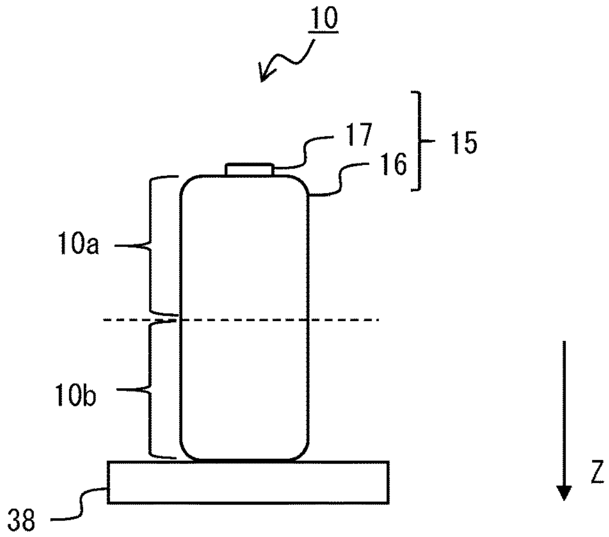
FIG. 2 is a side view illustrating a state in which the non-aqueous electrolyte secondary battery illustrated in FIG. 1 is fixed.

FIG. 2 is a side view illustrating a state in which the non-aqueous electrolyte secondary battery illustrated in FIG. 1 is fixed. The non-aqueous electrolyte secondary battery of the present embodiment is desirably used as an installed type or stationary power source installed indoors or outdoors, or a power source installed in a movable object such as an electric vehicle. As illustrated in FIG. 2, the non-aqueous electrolyte secondary battery 10 used as such a power source is installed and used in a fixed state on a fixing portion 38 such as a mounting table, a case, or the like. The phrase "used in a fixed state" means that the orientation of the non-aqueous electrolyte secondary battery 10 is not significantly changed after the non-aqueous electrolyte secondary battery 10 is installed in the fixing portion 38 and started to be used. For example, a non-aqueous electrolyte secondary battery used as a power source of a mobile phone is not included in the case of being used in a fixed state because it is placed in any orientation with use of the mobile phone.

In FIG. 2, an arrow Z indicates the vertical direction (gravity direction). That is, the non-aqueous electrolyte secondary battery 10 illustrated in FIG. 2 is provided to stand along the vertical direction. More specifically, the non-aqueous electrolyte secondary battery 10 illustrated in FIG. 2 is installed such that the bottom of the battery case 15 is in contact with the fixing portion 38, and the height direction of the non-aqueous electrolyte secondary battery 10 is along the vertical direction.

Figure 3:
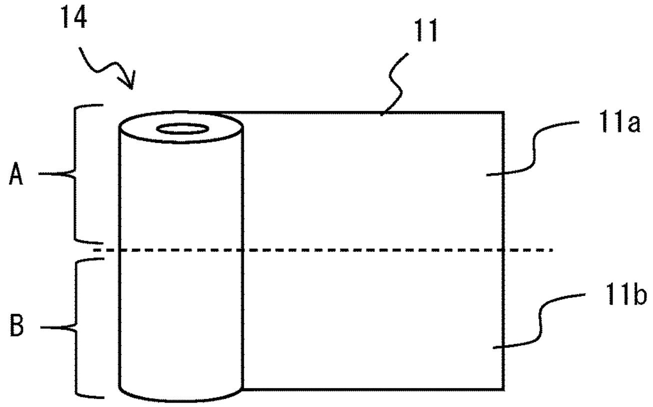
FIG. 3 is a perspective view of a wound electrode assembly used in the non-aqueous electrolyte secondary battery of FIG. 2.

FIG. 3 is a perspective view of a wound electrode assembly used in the non-aqueous electrolyte secondary battery of FIG. 2. Provided that, in FIG. 3, in order to facilitate the description of the configuration of the positive electrode 11, a part (winding end) of the positive electrode 11 to be wound around the electrode assembly 14 is illustrated in a state before winding. Here, a region A of the electrode assembly 14 illustrated in FIG. 3 is a region corresponding to an upper half region 10*a* when the electrode assembly 14 housed in the non-aqueous electrolyte secondary battery 10 illustrated in FIG. 2 is divided into two equal parts in the vertical direction. A region B of the electrode assembly 14 illustrated in FIG. 3 is a region corresponding to a lower half region 10*b* when the electrode assembly 14 housed in the non-aqueous electrolyte secondary battery 10 illustrated in FIG. 2 is divided into two equal parts in the vertical direction.

In the present embodiment, the dibutyl phthalate oil absorption of the positive electrode active material contained in a positive electrode mixture layer 11*a* disposed in the region A (that is, the upper half region 10*a* illustrated in FIG. 2) illustrated in FIG. 3 is higher than the dibutyl phthalate oil absorption of the positive electrode active material contained in a positive electrode mixture layer 11*b* disposed in the region B (that is, the lower half region 10*b* illustrated in FIG. 2) illustrated in FIG. 3. Since the height direction of the non-aqueous electrolyte secondary battery 10 illustrated in FIG. 2 is along the vertical direction, the vertical direction can be rephrased as the height direction of the non-aqueous electrolyte secondary battery 10. That is, when the electrode assembly 14 is divided into two equal parts in the height direction of the non-aqueous electrolyte secondary battery 10, the dibutyl phthalate oil absorption of the positive electrode active material contained in the positive electrode mixture layer disposed in the upper half region is higher than the dibutyl phthalate oil absorption of the positive electrode active material contained in the positive electrode mixture layer disposed in the lower half region.

Figure 4:
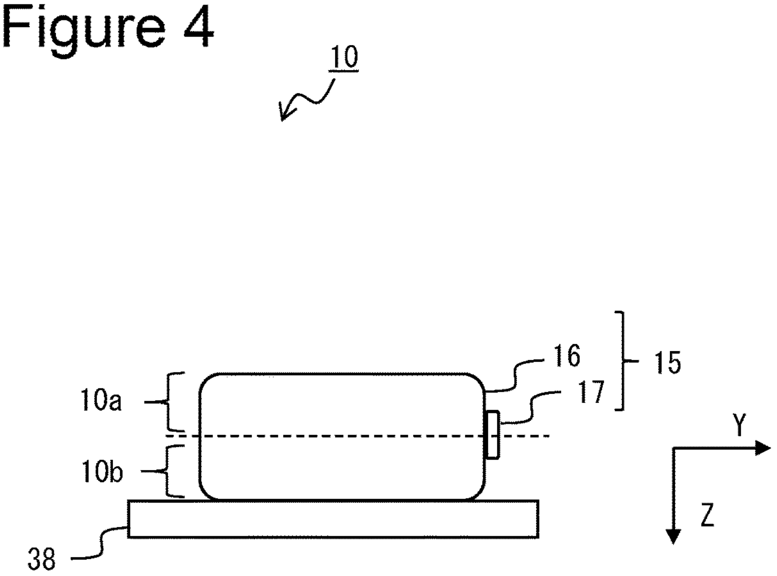
FIG. 4 is a side view illustrating another example of a state in which the non-aqueous electrolyte secondary battery illustrated in FIG. 1 is fixed.

FIG. 4 is a side view illustrating another example of a state in which the non-aqueous electrolyte secondary battery illustrated in FIG. 1 is fixed. In FIG. 4, an arrow Z indicates the vertical direction (gravity direction), and an arrow Y indicates the direction (horizontal direction) orthogonal to the vertical direction. The non-aqueous electrolyte secondary battery 10 illustrated in FIG. 4 is installed such that the side face of the battery case 15 is in contact with the fixing portion 38, and the height direction of the non-aqueous electrolyte secondary battery 10 is along the direction (horizontal direction) orthogonal to the vertical direction.

Figure 5:
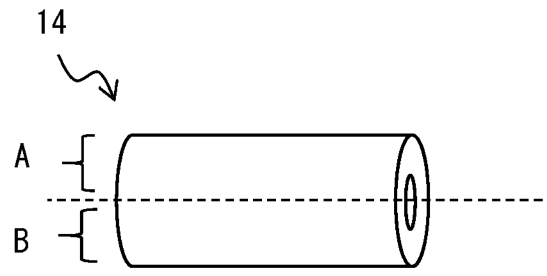
FIG. 5 is a perspective view of a wound electrode assembly used in the non-aqueous electrolyte secondary battery of FIG. 4.

FIG. 5 is a perspective view of a wound electrode assembly used in the non-aqueous electrolyte secondary battery of FIG. 4. Here, the region A of the electrode assembly 14 illustrated in FIG. 5 is a region corresponding to the upper half region 10*a* when the electrode assembly 14 housed in the non-aqueous electrolyte secondary battery 10 illustrated in FIG. 4 is divided into two equal parts in the vertical direction. The region B of the electrode assembly 14 illustrated in FIG. 5 is a region corresponding to the lower half region 10*b* when the electrode assembly 14 housed in the non-aqueous electrolyte secondary battery 10 illustrated in FIG. 4 is divided into two equal parts in the vertical direction.

In the present embodiment, the dibutyl phthalate oil absorption of the positive electrode active material contained in the positive electrode mixture layer disposed in the region A (that is, the upper half region 10*a* illustrated in FIG. 4) illustrated in FIG. 5 is higher than the dibutyl phthalate oil absorption of the positive electrode active material contained in the positive electrode mixture layer disposed in the region B (that is, the lower half region 10*b* illustrated in FIG. 4) illustrated in FIG. 5.

In the non-aqueous electrolyte secondary battery 10 used in a fixed state, the non-aqueous electrolyte in the battery case 15 is unevenly distributed in the lower part in the vertical direction by gravity, and the non-aqueous electrolyte is easily depleted in the upper part in the vertical direction. When the non-aqueous electrolyte is unevenly distributed as described above, charge-discharge cycle characteristics are deteriorated. However, as in the non-aqueous electrolyte secondary battery 10 of the present embodiment, by setting the dibutyl phthalate oil absorption of the positive electrode active material contained in the positive electrode mixture layer disposed in the upper half region 10*a* to be higher than the dibutyl phthalate oil absorption of the positive electrode active material contained in the positive electrode mixture layer disposed in the lower half region 10*b*, the retention characteristics of the non-aqueous electrolyte is improved in the upper part in the vertical direction. Therefore, the non-aqueous electrolyte is suppressed from being unevenly distributed in the lower part in the vertical direction, and the charge-discharge cycle characteristics can be improved accordingly. In the above description, a non-aqueous electrolyte secondary battery including a bottomed cylindrical battery case having a cylindrical shape and a wound electrode assembly has been described as an example. However, the same effect can be obtained even in the case of a non-aqueous electrolyte secondary battery including a bottomed cylindrical battery case having a rectangular shape, a stacked electrode assembly, or the like.

In the present embodiment, the dibutyl phthalate oil absorption of the positive electrode active material contained in the positive electrode mixture layer disposed in the upper half region 10*a* is preferably greater than or equal to 15 mL/100 g and less than or equal to 23 mL/100 g, more preferably greater than or equal to 16 mL/100 g and less than or equal to 22 mL/100 g, and still more preferably greater than or equal to 17 mL/100 g and less than or equal to 21 mL/100 g from the viewpoint of improving charge-discharge cycle characteristics and the like. In addition, in the present embodiment, the dibutyl phthalate oil absorption of the positive electrode active material contained in the positive electrode mixture layer disposed in the lower half region 10*b* is preferably greater than or equal to 11 mL/100 g and less than or equal to 19 mL/100 g, more preferably greater than or equal to 12 mL/100 g and less than or equal to 18 mL/100 g, and still more preferably greater than or equal to 13 mL/100 g and less than or equal to 17 mL/100 g from the viewpoint of improving charge-discharge cycle characteristics and the like.

The value of the dibutyl phthalate oil absorption of the positive electrode contained in the positive electrode mixture layer disposed in the upper half region 10*a* and the lower half region 10*b* is an average value. That is, each of the positive electrode mixture layer disposed in the upper half region 10*a* and the positive electrode mixture layer disposed in the lower half region 10*b* may contain a plurality of positive electrode active materials having different dibutyl phthalate oil absorptions. For example, when the positive electrode mixture layer disposed in the upper half region 10*a* contains three types of positive electrode active materials (P1, P2, P3) having different dibutyl phthalate oil absorptions, the dibutyl phthalate oil absorption of the positive electrode active material contained in the positive electrode mixture layer is the dibutyl phthalate oil absorption of a mixture including the positive electrode active materials P1, P2, and P3. The same applies to the case of the positive electrode mixture layer disposed in the lower half region 10*b*.

When the oil absorption of the mixture including a plurality of positive electrode active materials in the positive electrode mixture layer disposed in the upper half region 10*a* is greater than or equal to 15 mL/100 g and less than or equal to 23 mL/100 g, the dibutyl phthalate oil absorptions of all the positive electrode active materials are desirably greater than or equal to 15 mL/100 g and less than or equal to 23 mL/100 g. However, when the dibutyl phthalate oil absorption of the mixture including a plurality of positive electrode active materials contained in the positive electrode mixture layer disposed in the upper half region 10*a* satisfies greater than or equal to 15 mL/100 g and less than or equal to 23 mL/100 g, the dibutyl phthalate oil absorption of each of the positive electrode active materials does not necessarily satisfy the above range. For example, when the positive electrode mixture layer disposed in the upper half region 10*a* includes two types of positive electrode active materials (P1, P2) having different dibutyl phthalate oil absorptions, if the dibutyl phthalate oil absorption of a mixture including the positive electrode active materials P1 and P2 is greater than or equal to 15 mL/100 g and less than or equal to 23 mL/100 g, the dibutyl phthalate oil absorption of the positive electrode active material P1 may be, for example, less than 15 mL/100 g, and the dibutyl phthalate oil absorption of the positive electrode active material P2 may be, for example, more than 23 mL/100 g. In this case, it is necessary to adjust the contents of the positive electrode active materials P1 and P2 so that the dibutyl phthalate oil absorption of the mixture including the positive electrode active materials P1 and P2 is greater than or equal to 15 mL/100 g and less than or equal to 23 mL/100 g.

Similarly, in the positive electrode mixture layer disposed in the lower half region 10*b*, when the oil absorption of the mixture including a plurality of positive electrode active materials is greater than or equal to 11 mL/100 g and less than or equal to 19 mL/100 g, the dibutyl phthalate oil absorptions of all the positive electrode active materials are desirably greater than or equal to 11 mL/100 g and less than or equal to 19 mL/100 g. However, when the dibutyl phthalate oil absorption of the mixture including a plurality of positive electrode active materials contained in the positive electrode mixture layer disposed in the lower half region 10*b* satisfies greater than or equal to 11 mL/100 g and less than or equal to 19 mL/100 g, the dibutyl phthalate oil absorption of each of the positive electrode active materials does not necessarily satisfy the above range. For example, when the positive electrode mixture layer disposed in the lower half region 10*b* contains two types of positive electrode active materials (P1, P2) having different dibutyl phthalate oil absorptions, if the dibutyl phthalate oil absorption of a mixture including the positive electrode active materials P1 and P2 is greater than or equal to 11 mL/100 g and less than or equal to 19 mL/100 g, the dibutyl phthalate oil absorption of the positive electrode active material P1 may be, for example, less than 11 mL/100 g, and the dibutyl phthalate oil absorption of the positive electrode active material P2 may be, for example, more than 19 mL/100 g. In this case, it is necessary to adjust the contents of the positive electrode active materials P1 and P2 so that the dibutyl phthalate oil absorption of the mixture including the positive electrode active materials P1 and P2 is greater than or equal to 11 mL/100 g and less than or equal to 19 mL/100 g.

The non-aqueous electrolyte secondary battery 10 illustrated in FIG. 2 is fixed such that the bottom of the exterior can 16 is in contact with the fixing portion 38. In this case, when the electrode assembly 14 is divided into two equal parts in the insertion direction into the exterior can 16, the dibutyl phthalate oil absorption of the positive electrode active material contained in the positive electrode mixture layer disposed in a half region on the side of the sealing assembly 17 is made higher than the dibutyl phthalate oil absorption of the positive electrode active material contained in the positive electrode mixture layer disposed in a half region on the bottom side of the exterior can 16. When the battery case 15 includes the bottomed cylindrical exterior can 16 and the sealing assembly 17, the non-aqueous electrolyte secondary battery 10 can be fixed such that the sealing assembly 17 is in contact with the fixing portion 38 instead of the bottom of the exterior can 16. In this case, when the electrode assembly 14 is divided into two equal parts in the insertion direction into the exterior can 16, the dibutyl phthalate oil absorption of the positive electrode active material contained in the positive electrode mixture layer disposed in a half region on the bottom side of the exterior can 16 is made higher than the dibutyl phthalate oil absorption of the positive electrode active material contained in the positive electrode mixture layer disposed in a half region on the side of the sealing assembly 17. This improves the charge-discharge cycle characteristics of the non-aqueous electrolyte secondary battery 10.

The dibutyl phthalate oil absorption of the positive electrode active material is a value measured in accordance with the dibutyl phthalate (DBP) absorption. A method (mechanical method) defined in JIS K-6217-4 "Carbon black for rubber-fundamental characteristics-part 4: determination of DBP absorption". Specifically, DBP is added to a sample (positive electrode active material) stirred by two blades at a constant speed using an absorption tester (manufactured by Asahi Souken Co., Ltd., model "S-500"), a change in viscosity characteristic at this time is detected by a torque detector, an output thereof is converted into torque by a microcomputer, and DBP corresponding to a torque at 100% of a generated maximum torque is converted per 100 g of the sample (positive electrode active material) to obtain a dibutyl phthalate oil absorption.

Examples of the positive electrode active material include lithium-metal composite oxides containing transition metal elements such as Co, Mn, and Ni. Examples of the lithium-metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be independently used, or two or more thereof may be used in combination. The positive electrode active material preferably contains a lithium-nickel composite oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint of achieving increase in the capacity of the non-aqueous electrolyte secondary battery.

The positive electrode active material is obtained, for example, by mixing a precursor and a lithium compound, and firing the mixture. The precursor is obtained, for example, by adding dropwise an alkali solution such as a sodium hydroxide solution to a solution containing metal salts of one or more metals such as transition metals while stirring the solution, adjusting the pH of the solution to the alkali side (for example, 8.5 to 11.5) to precipitate (coprecipitate) a metal hydroxide, and subjecting the precipitated metal hydroxide to heat treatment. Then, by adjusting the heat treatment temperature, the heat treatment time, and the like in the heat treatment, precursors having different dibutyl phthalate oil absorptions are obtained, and eventually, positive electrode active materials having different dibutyl phthalate oil absorptions are obtained.

Examples of the conductive agent include carbon particles such as carbon black (CB), acetylene black (AB), Ketjen black, carbon nanotube (CNT), and graphite. These may be independently used, or two or more thereof may be used in combination.

Examples of the binder include fluorine-based resin such as polytetrafluoroethylene (PTFE) or polyvinylidene fluoride (PVdF), polyacrylonitrile (PAN), polyimide-based resin, acrylic resin, and polyolefin-based resin. These may be independently used, or two or more thereof may be used in combination.

An example of a method for producing the positive electrode mixture layer will be described. For example, a positive electrode active material having a dibutyl phthalate oil absorption of greater than or equal to 11 mL/100 g and less than or equal to 19 mL/100 g, a binder, a conductive agent, and the like are mixed together with a solvent to prepare a positive electrode mixture slurry B for the lower half region 10*b*. In addition, separately from the slurry, a positive electrode active material having a dibutyl phthalate oil absorption of greater than or equal to 15 mL/100 g and less than or equal to 23 mL/100 g, a binder, a conductive agent, and the like are mixed together with a solvent to prepare a positive electrode mixture slurry A for the upper half region 10*a*. In the case of the non-aqueous electrolyte secondary battery used in the state illustrated in FIG. 2, the positive electrode mixture slurries A and B are applied so as to be along the longitudinal direction of the positive electrode current collector, and be adjacent to each other in the width direction orthogonal to the longitudinal direction. In the case of the non-aqueous electrolyte secondary battery used in the state illustrated in FIG. 4, the positive electrode mixture slurries A and B are alternately applied in a predetermined length along the longitudinal direction of the positive electrode current collector. The applied slurry is then dried, and the coated film is rolled to form a positive electrode mixture layer.

[Negative Electrode]

The negative electrode 12 includes a negative electrode current collector and a negative electrode mixture layer provided on the negative electrode current collector. For example, a foil of a metal which is stable within the potential range of the negative electrode, such as copper, a film in which the metal is disposed on a surface layer thereof, or the like is used for the negative electrode current collector.

The negative electrode mixture layer contains a negative electrode active material, and preferably further contains a binder, a conductive agent, and the like. The negative electrode 12 can be produced, for example, by preparing a negative electrode mixture slurry containing a negative electrode active material, a binder, and the like, applying the negative electrode mixture slurry onto a negative electrode current collector, drying the slurry to form a negative electrode mixture layer, and rolling the negative electrode mixture layer.

The negative electrode active material is capable of reversibly absorbing and releasing lithium ions, and examples thereof include carbon materials such as natural graphite and artificial graphite; metals alloyed with lithium, such as silicon (Si) and tin (Sn); alloys containing metal elements such as Si and Sn; and composite oxides.

Examples of the binder include fluorine-based resin, PAN, polyimide-based resin, acrylic resin, polyolefin-based resin, styrene-butadiene rubber (SBR), carboxymethyl cellulose (CMC) or a salt thereof, polyacrylic acid (PAA) or a salt thereof (PAA-Na, PAA-K, and the like, and a partially neutralized salt thereof may be used), and polyvinyl alcohol (PVA). These may be independently used, or two or more thereof may be used in combination.

Examples of the conductive agent include carbon particles such as carbon black (CB), acetylene black (AB), Ketjen black, carbon nanotube (CNT), and graphite. These may be independently used, or two or more thereof may be used in combination.

[Separator]

A porous sheet having ion permeability and insulation properties is used as the separator 13, for example. Specific examples of the porous sheet include a fine porous thin film, a woven fabric, and a nonwoven fabric. As material of the separator, olefin-based resin such as polyethylene or polypropylene, cellulose, or the like is suitable. The separator 13 may be a layered body having a cellulose fiber layer and a fiber layer of thermoplastic resin such as olefin-based resin. In addition, the separator 13 may be a multilayer separator having a polyethylene layer and a polypropylene layer, and a separator having a surface coated with a material such as aramid-based resin or ceramic may be used.

[Non-Aqueous Electrolyte]

The non-aqueous electrolyte contains a non-aqueous solvent and an electrolyte salt dissolved in the non-aqueous solvent. Examples of the non-aqueous solvent that can be used include esters, ethers, nitriles such as acetonitrile, amides such as dimethylformamide, and mixed solvents of two or more types thereof. The non-aqueous solvent may contain a halogen-substituted compound in which at least a part of hydrogen in these solvents is substituted with a halogen atom such as fluorine.

Examples of the esters include cyclic carbonic acid esters such as ethylene carbonate (EC), propylene carbonate (PC), and butylene carbonate; chain carbonic acid esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylic acid esters such as γ-butyrolactone and γ-valerolactone; and chain carboxylic acid esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted compound, it is preferable to use a fluorinated cyclic carbonic acid ester such as fluoroethylene carbonate (FEC), a fluorinated chain carbonic acid ester, a fluorinated chain carboxylic acid ester such as methyl fluoropropionate (FMP), or the like.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$(1<x<6, n is 1 or 2), $LiB_{10}Cl_{10}$, LiCl, LiBr, LiI, chloroborane lithium, lower aliphatic lithium carboxylate, borates such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {1 and m are each an integer of 1 or more}. These lithium salts may be independently used, or two or more thereof may be used in combination. Among them, $LiPF_6$ is preferably used from the viewpoint of ion conductivity, electrochemical stability, and the like. The concentration of the lithium salt is preferably 0.8 to 1.8 mol per 1 L of the solvent.

EXAMPLES

Hereinafter, the present disclosure will be further described with reference to examples, but the present disclosure is not limited to these examples.

(Preparation of Lithium-Metal Composite Oxide A)

A precursor obtained by preparing a nickel-cobalt-aluminum composite hydroxide by coprecipitation and then subjecting the nickel-cobalt-aluminum composite hydroxide to heat treatment, and lithium hydroxide monohydrate ($LiOH \cdot H_2O$) were mixed such that the atomic ratio among lithium, nickel, cobalt, and aluminum was Li:Ni:Co:Al=1.00: 0.82:0.15:0.03. The mixed powder was fired at 750° C. for 15 hours in an electric furnace under an oxygen atmosphere to obtain a lithium-metal composite oxide A.

(Preparation of Lithium-Metal Composite Oxides B to D)

The lithium-metal composite oxides B to D were prepared under the same conditions as for the lithium-metal composite oxide A except that the heat treatment temperature and the heating time in the heat treatment of the nickel-cobalt-aluminum composite hydroxide were changed.

Table 1 summarizes the dibutyl phthalate oil absorptions of the lithium-metal composite oxides A to D. The method for measuring the dibutyl phthalate oil absorption is as described above.

TABLE 1

| | Dibutyl phthalate oil absorption (mL/100 g) |
|---|---|
| Lithium-metal composite oxide A | 11.0 |
| Lithium-metal composite oxide B | 15.0 |
| Lithium-metal composite oxide C | 19.0 |
| Lithium-metal composite oxide D | 23.0 |

TABLE 1-continued

Example 1

[Production of Positive Electrode]

In an N-methylpyrrolidone (NMP) solvent, the lithium-metal composite oxide A as a positive electrode active material, acetylene black as a conductive agent, and polyvinylidene fluoride (PVDF) having an average molecular weight of 1,100,000, as a binder, were mixed at a mass ratio of 98:1:1 to prepare a slurry having a solid content of 70 mass %. This was used as a positive electrode mixture slurry for the lower half region.

In addition, in an N-methylpyrrolidone (NMP) solvent, the lithium-metal composite oxide D as a positive electrode active material, acetylene black as a conductive agent, and polyvinylidene fluoride (PVDF) having an average molecular weight of 1,100,000, as a binder, were mixed at a mass ratio of 98:1:1 to prepare a slurry having a solid content of 70 mass %. This was used as a positive electrode mixture slurry for the upper half region.

The positive electrode mixture slurry for the lower half region and the positive electrode mixture slurry for the upper half region were applied in a stripe shape to both faces of an aluminum foil having a thickness of 15 μm, so as to be along the longitudinal direction of the aluminum foil and be adjacent to each other in the width direction orthogonal to the longitudinal direction. Thereafter, the slurry was dried, and the coated film was rolled with a rolling roller to produce a positive electrode.

[Production of Negative Electrode]

First, 95 parts by mass of graphite powder, 5 parts by mass of Si oxide, and 1 part by mass of carboxymethyl cellulose (CMC) were mixed together with an appropriate amount of water. To this mixture, 1.2 parts by mass of styrene-butadiene rubber (SBR) and an appropriate amount of water were added to prepare a negative electrode mixture slurry. The negative electrode mixture slurry was applied to both faces of a copper foil having a thickness of 8μm, and then the coated film was dried and rolled with a rolling roller to prepare a negative electrode including a negative electrode mixture layer formed on both faces of a negative electrode current collector.

[Preparation of Non-Aqueous Electrolyte]

To 100 parts by mass of a mixed solvent composed of ethylene carbonate (EC) and dimethyl carbonate (DMC) (EC:DMC=1:3 at a volume ratio), 5 parts by mass of vinylene carbonate (VC) was added, and $LiPF_6$ was dissolved therein at a concentration of 1 mol/L. This was used as a non-aqueous electrolyte.

[Production of Secondary Battery]

(1) A lead was attached to each of the positive electrode and the negative electrode, and then the positive electrode and the negative electrode were wound with a polyethylene separator having a thickness of 20 μm interposed therebetween, to produce a wound electrode assembly.

(2) The electrode assembly was inserted into an exterior can, the lead on the negative electrode side was welded to the bottom of the exterior can, and the lead on the positive electrode side was welded to a sealing assembly. The electrode assembly was inserted into the exterior can such that, when the electrode assembly was divided into two equal parts in the height direction of the non-aqueous electrolyte secondary battery, the positive electrode mixture layer disposed in the upper half region was derived from the positive electrode mixture slurry for the upper half region, and the positive electrode mixture layer disposed in the lower half region was derived from the positive electrode mixture slurry for the lower half region.

(3) The non-aqueous electrolyte was injected into the exterior can, and then the opening end of the exterior can was crimped to the sealing assembly with a gasket interposed therebetween. This was subjected to non-aqueous electrolysis to obtain a secondary battery.

EXAMPLE 2

A non-aqueous electrolyte secondary battery was produced in the same manner as in Example 1 except that the lithium-metal composite oxide C was used as a positive electrode active material used for the positive electrode mixture slurry for the lower half region.

EXAMPLE 3

A non-aqueous electrolyte secondary battery was produced in the same manner as in Example 1 except that the lithium-metal composite oxide B was used as a positive electrode active material used for the positive electrode mixture slurry for the upper half region.

Comparative Example 1

A non-aqueous electrolyte secondary battery was produced in the same manner as in Example 1 except that the lithium-metal composite oxide D was used as a positive electrode active material used for the positive electrode mixture slurry for the lower half region and the lithium-metal composite oxide A was used as a positive electrode active material used for the positive electrode mixture slurry for the upper half region.

Comparative Example 2

A non-aqueous electrolyte secondary battery was produced in the same manner as in Example 1 except that the lithium-metal composite oxide A was used as a positive electrode active material used for the positive electrode mixture slurry for the upper half region.

Comparative Example 3

A non-aqueous electrolyte secondary battery was produced in the same manner as in Example 1 except that the lithium-metal composite oxide D was used as a positive electrode active material used for the positive electrode mixture slurry for the lower half region.

[Evaluation of Charge-Discharge Cycle Characteristics]

The non-aqueous electrolyte secondary batteries of Examples and Comparative Examples were each installed on the mounting table such that the bottom of the non-aqueous electrolyte secondary battery was brought into contact with the mounting table, and the height direction of the battery was along the vertical direction. Then, each of the non-aqueous electrolyte secondary batteries was charged at a constant current of 0.7 It under a temperature environment of 25° C. until the voltage reached 4.2 V, and then charged at a constant voltage of 4.2 V until the current reached 0.05 It. The battery was then discharged at a constant current of 0.7 It until the voltage reached 2.5 V. This charge-discharge cycle was defined as 1 cycle, 1,000 cycles were performed, and the capacity retention rate was determined by the following formula.

Capacity retention rate (%)=(discharge capacity at 1,000th cycle/discharge capacity at 1st cycle)×100

Table 2 summarizes the results of the charge-discharge cycle characteristics of Examples and Comparative Examples.

TABLE 2

| | Dibutyl phthalate oil absorption of positive electrode active material (mL/100 g) | | Capacity |
|---|---|---|---|
| | Upper half region | Lower half region | retention rate |
| Example 1 | 23.0 | 11.0 | 65% |
| Example 2 | 23.0 | 19.0 | 62% |
| Example 3 | 15.0 | 11.0 | 63% |
| Comparative Example 1 | 11.0 | 23.0 | 45% |
| Comparative Example 2 | 11.0 | 11.0 | 52% |
| Comparative Example 3 | 23.0 | 23.0 | 58% |

In all of Examples 1 to 3, the capacity retention rates in the charge-discharge cycles were higher than those in Comparative Examples 1 to 3. From these, as in Examples 1 to 3, when the non-aqueous electrolyte secondary battery is used in a fixed state and the electrode assembly is divided into two equal parts in the vertical direction, the charge-discharge cycle characteristics can be improved by making the dibutyl phthalate oil absorption of the positive electrode active material contained in the positive electrode mixture layer disposed in the upper half region higher than the dibutyl phthalate oil absorption of the positive electrode active material contained in the positive electrode mixture layer disposed in the lower half region.

REFERENCE SIGNS LIST

10 Non-aqueous electrolyte secondary battery
**10*a*** Upper half region
**10*b*** Lower half region
11 Positive electrode
**11*a*, 11*b*** Positive electrode mixture layer
12 Negative electrode
13 Separator
14 Electrode assembly
15 Battery case
16 Exterior can
17 Sealing assembly
18, 19 Insulating plate
20 Positive electrode lead
21 Negative electrode lead
22 Projecting portion
23 Filter
24 Lower vent member
25 Insulating member
26 Upper vent member
27 Cap
28 Gasket
38 Fixing portion

The invention claimed is:

1. A non-aqueous electrolyte secondary battery comprising:

an electrode assembly including a positive electrode, a negative electrode, and a separator, the positive electrode and the negative electrode being wound with the separator interposed between the positive electrode and the negative electrode; and a battery case that houses the electrode assembly, wherein the positive electrode has a positive electrode mixture layer containing a positive electrode active material, and when the non-aqueous electrolyte secondary battery is used in a fixed state and the electrode assembly in the fixed state is divided into two equal parts in a vertical direction, a dibutyl phthalate oil absorption of the positive electrode active material contained in the positive electrode mixture layer disposed in an upper half region is higher than a dibutyl phthalate oil absorption of the positive electrode active material contained in the positive electrode mixture layer disposed in a lower half region.

2. The non-aqueous electrolyte secondary battery according to claim 1, wherein a dibutyl phthalate oil absorption of the positive electrode active material contained in the positive electrode mixture layer disposed in the upper half region is greater than or equal to 15 mL/100 g and less than or equal to 23 mL/100 g, and a dibutyl phthalate oil absorption of the positive electrode active material contained in the positive electrode mixture layer disposed in the lower half region is greater than or equal to 11 mL/100 g and less than or equal to 19 mL/100 g.

3. A non-aqueous electrolyte secondary battery comprising:

an electrode assembly including a positive electrode, a negative electrode, and a separator, the positive electrode and the negative electrode being wound with the separator interposed between the positive electrode and the negative electrode; an exterior can that has a bottomed cylindrical shape and houses the electrode assembly; and a sealing assembly that closes an opening of the exterior can, wherein the positive electrode has a positive electrode mixture layer containing a positive electrode active material, when the electrode assembly is divided into two equal parts in an insertion direction into the exterior can, a dibutyl phthalate oil absorption of the positive electrode active material contained in the positive electrode mixture layer disposed in a half region on a side of the sealing assembly is higher than a dibutyl phthalate oil absorption of the positive electrode active material contained in the positive electrode mixture layer disposed in a half region on a bottom side of the exterior can, a direction from the sealing assembly toward a bottom of the exterior can corresponds to a vertical direction and the insertion direction of the electrode assembly into the exterior can, the vertical direction corresponds to gravity direction, and a winding axis direction of the electrode assembly is parallel to the insertion direction of the electrode assembly into the exterior can.

4. The non-aqueous electrolyte secondary battery according to claim 3, wherein the dibutyl phthalate oil absorption of the positive electrode material contained in the positive electrode mixture layer disposed in a half region on a side of the sealing assembly is greater than or equal to 15 mL/100 g and less than or equal to 23 mL/100 g, and the dibutyl phthalate oil absorption of the positive electrode active material contained in the positive electrode mixture layer disposed in a half region on a bottom side of the exterior can is greater than or equal to 11 mL/100 g and less than or equal to 19 mL/100 g.

5. A non-aqueous electrolyte secondary battery comprising:

an electrode assembly including a positive electrode, a negative electrode, and a separator, the positive electrode and the negative electrode being wound with the separator interposed between the positive electrode and the negative electrode; an exterior can that has a bottomed cylindrical shape and houses the electrode assembly; and a sealing assembly that closes an opening of the exterior can, wherein the positive electrode has a positive electrode mixture layer containing a positive electrode active material, when the electrode assembly is divided into two equal parts in an insertion direction into the exterior can, a dibutyl phthalate oil absorption of the positive electrode active material contained in the positive electrode mixture layer disposed in a half region on a bottom side of the exterior can is higher than a dibutyl phthalate oil absorption of the positive electrode active material contained in the positive electrode mixture layer disposed in a half region on a side of the sealing assembly, a direction from a bottom of the exterior can toward the sealing assembly corresponds to a vertical direction and is parallel to the insertion direction of the electrode assembly into the exterior can, the vertical direction corresponds to gravity direction, and a winding axis direction of the electrode assembly is parallel to the insertion direction of the electrode assembly into the exterior can.

6. The non-aqueous electrolyte secondary battery according to claim 5, wherein the dibutyl phthalate oil absorption of the positive electrode material contained in the positive electrode mixture layer disposed in a half region on a bottom side of the exterior can is greater than or equal to 15 mL/100 g and less than or equal to 23 mL/100 g, and the dibutyl phthalate oil absorption of the positive electrode active material contained in the positive electrode mixture layer disposed in a half region on a side of the sealing assembly is greater than or equal to 11 mL/100 g and less than or equal to 19 mL/100 g.

* * * * *